May 26, 1964
C. G. ROSE
3,134,733
SCREENS
Filed Jan. 9, 1961
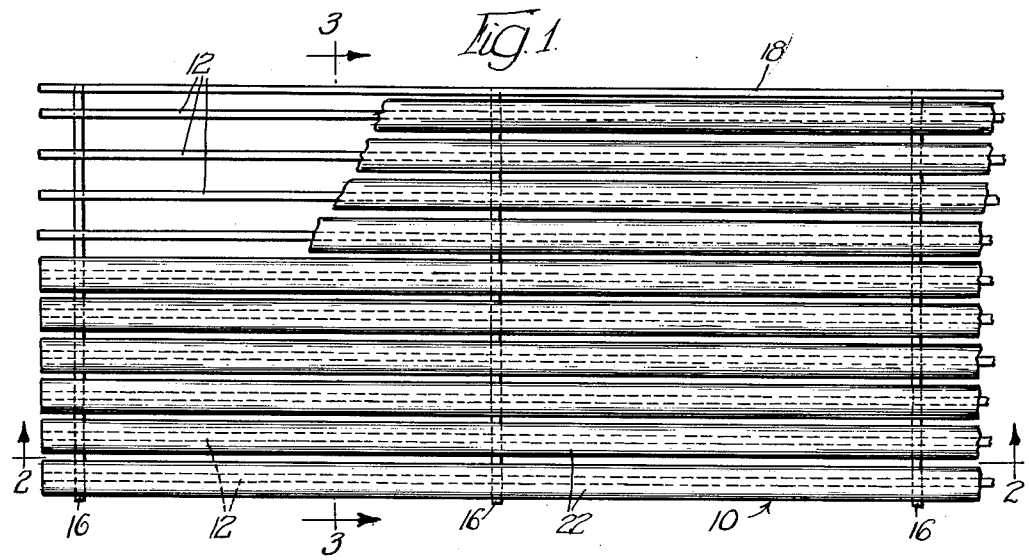
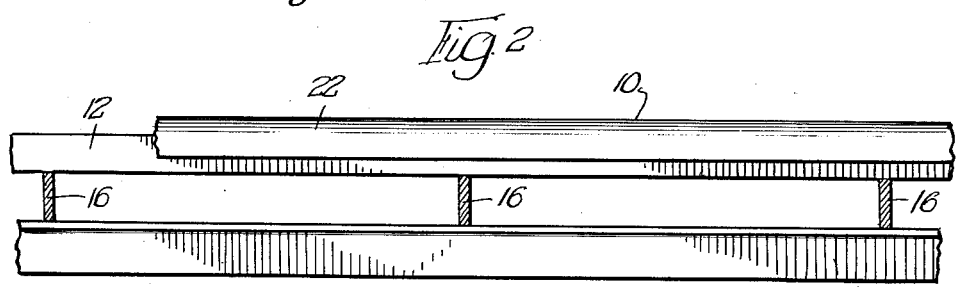
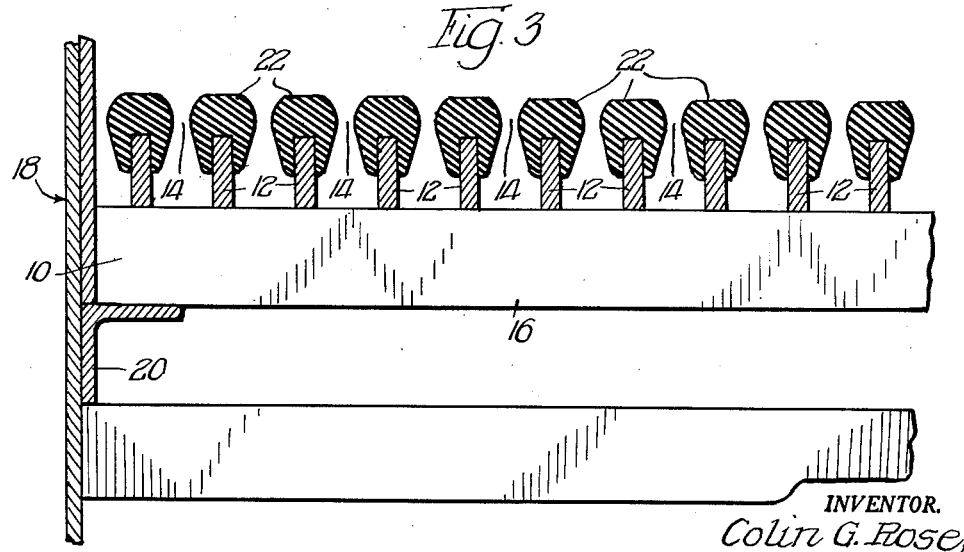
INVENTOR.
Colin G. Rose,
BY
Byron, Hume, Groen + Clement
Attys.

United States Patent Office 3,134,733
Patented May 26, 1964

3,134,733
SCREENS
Colin G. Rose, Galesburg, Ill., assignor to Bixby-Zimmer Engineering Company, Galesburg, Ill., a partnership
Filed Jan. 9, 1961, Ser. No. 81,599
2 Claims. (Cl. 209—393)

This invention pertains to screens and other similar structure, and in particular, to a screen particularly suited for sorting and classifying solids according to size and including the separation of liquids from solids.

The technological advances of methods of processing and manufacturing have required greater efficiency in the sorting of solids including the grading and sizing of solids and the separation of liquids from solids in numerous fields, such as mining, smelting, chemical, foods and the like. Most of the liquid and solid separation is done on screen surfaces as used in machinery such as vibrating screens, trommels, filters and the like. These screen surfaces are of numerous types and include woven wire, punched plate, assembled rods, welded wires or rods and the like, arranged to produce square, round, rectangular and various other shaped slots of a predetermined size to allow liquids and solids to pass therethrough.

Such screens comprised of metallic materials are used extensively in industry and these screens will eventually wear from use and must be replaced. Under certain circumstances, it may be advisable to replace the entire screen, however, under other circumstances it may be advisable to replace only the worn screening elements and to leave the frame members and the supporting structure in place. During the time that the screen or the worn screening elements are being replaced, the screen is not available for use with the result of what is termed in industry as "down-time."

As can be readily understood, the elimination of any "down-time" would create considerable interest in the screen field. "Down-time" is dependent upon how long the screening elements can last without excessive wear and also how quickly the worn elements can be replaced.

In accordance with the above, it is a general object of the invention to provide a screen that is especially adapted for efficient operation.

It is another object of the invention to provide a screen wherein the elements of the screen subjected to wear are readily replaced with a minimum amount of effort and time.

It is another object of the invention to provide a screen having a longer and more useful life.

It is another object of the invention to provide a screen adaptable to the screening of soft or friable material where breakage of the material is objectionable.

Briefly, the invention relates to screens comprised of screen rods or the like wherein the screen rods are provided with a resilient covering over the portion of the rod that normally comes into contact with the material to be screened. The resilient covering may, if desired, be removably attached to the screen rods and, therefore, readily replaceable after wear.

Other features and objects of the invention will be apparent upon reading of the specification with reference to the following drawings.

In the drawings:
FIGURE 1 is a plan view of a screen embodying the features of the invention;
FIGURE 2 is an enlarged sectional view taken along the line 2—2 in FIGURE 1; and
FIGURE 3 is an enlarged sectional view taken along the line 3—3 in FIGURE 1.

The arbitrary names of rods and cross bars have been selected for two of the elements used in the construction of the screen embodying the invention. It is to be understood that these names are not to be construed as limitations as to size and character of these elements and that the dimensions may be varied to suit the particular application. It will be further understood that the rods and cross-bars may be of a various cross-section. As shown in the drawings, the crossbars have rectangular cross-section although this is merely by way of example. The cross-sections of the screen rods and cross-bars may be circular, triangular, rectangular or of any shape which is necessary to fill the particular need of application.

Referring now to FIGURES 1 through 3 there is shown one form of the screen embodying the features of the invention, and the screen is denoted by the numeral 10. The screen 10 is composed of a plurality of rods 12, a plurality of cross-bars 16 and a plurality of resilient coverings 22. The rods 12 usually extend in a direction generally parallel to that in which the material travels over the screen surface. However, the rods 12 may extend in a direction generally traverse to that in which the material travels over the screen surface under appropriate circumstances.

In this particular instance the rods 12 are of a rectangular cross-section. However, this is merely by way of example and it is not to be considered as a limitation. The cross-sectional construction of the rods may be varied to suit the particular applications and, for example, may be circular, elliptical, rectangular or of any polygonal configuration. As can be seen from FIGURES 1 and 2, the rods 12 are mounted in a closely spaced substantially parallel relationship.

The rods 12 are held in the aforementioned parallel closely spaced relationship by means of cross-bars 16 which are provided at suitable intervals. The cross-bars 16 may be secured to the rods 12 by any suitable means such as welding, soldering, brazing, tying, or by mechanical means, such as screws, clips or other methods. The cross-bars 16 have been shown by way of example as being of a rectangular cross-section and it is apparent that they can be of any size, shape or spacing necessary to fill the particular need.

Referring particularly to FIGURE 3, the cross-bars 16 may be secured by any suitable means such as the screen supporting frame 18. In the embodiment of the invention illustrated in the drawings, the cross-bars 16 are secured to a screen supporting frame 18 by a plurality of angle brackets 20.

In accordance with the teachings of the invention, a resilient covering 22 is provided for each rod 12 over that portion of the rod 12 that normally comes into contact with the material to be screened. As a result, the rods 12 and their coverings 22 define a plurality of elongated spaces 14 which are of a predetermined size and through which the liquid and undersized material may pass.

The resilient covering 22 is preferably composed of wear resistant rubber and is preferably extruded into a shape to fit tightly over the rods 12. The resilient coverings 22 may optionally be molded right to the rods 12 or held to the rods 12 by a bonding agent or tied, riveted, bolted, or attached in any suitable manner. Although wear resistant rubber is preferred for the resilient coverings 22, the resilient coverings 22 may be made of materials such as plastic, ceramic, fiberglass, and so forth. The provision of a resilient covering 22 for each rod 12 increases the useful life of the screen.

Another important advantage of the use of the resilient coverings 22 is that the resilient coverings 22 optionally may be readily removed from the rods 12 depending, of course, on how the resilient coverings 22 are fastened to the rods 12. If the resilient coverings 22 are formed such that they can be readily inserted in a tight relationship over the rods 12 by manual pressure, then it is relatively easy to remove the resilient coverings 22 and the resilient coverings 22 can be readily removed by one man and in a very short time, and a replacement, therefore, can be quickly secured to the rod 12. If the resilient coverings 22 are bolted or otherwise tied, more time will be required to remove the resilient coverings 22.

An important feature of the invention is that worn resilient coverings 22 may be readily removed from the rods 12 and because of their longer wearing characteristics need be replaced at longer intervals, thereby reducing the down-time of the screen in that the screen is down a lesser number of times, and when it is down it is down for a shorter period. I have also found that the resilient covering is very advantageous where friable material is to be screened. One such application involves the sizing of green iron ore pellets in taconite iron concentrating plants. The green iron ore pellets comprise finely ground iron ore concentrate, held together with water and binder. The resilient coverings 22 are relatively gentle with the iron ore pellets and proper sizing occurs without an undue amount of pellet breakage.

The resilient coverings 22 may be provided for various screen sizes and screen openings and could be utilized to vary the screen opening of a predetermined screen by merely varying the size of the resilient coverings 22.

If desired, the rods 12 could be designed to be removable in situations, for example where the resilient covering 22 is held to the rods 12 by a bonding agent or the like where it is not practical to remove the resilient covering 22 from the rod 12 when the rod 12 and resilient covering 22 are assembled in the screen.

Although a specific form of the invention has been described herein, it is to be understood that this is merely by way of example and is in no manner to be construed as a limitation. It will be apparent that certain modifications may be made within the scope of the claims without departing from the spirit of the invention.

What is claimed is:

1. A planar screen structure for sorting and classifying material without imparting damaging forces to said material, which screen structure comprises a plurality of elongated screen forming rods having a preselected cross-sectional configuration, a plurality of cross bars, said cross bars being mounted in predetermined spaced relation transversely of and beneath said screen forming rods and being secured to said screen forming rods so as to maintain said rods in desired spaced parallel relation, said joined screen forming rods and cross bars defining regions of preselected size wherethrough a portion of the material being screened may pass, and a plurality of elongated readily removable resilient coverings, each of said coverings having a slotted mating portion adjacent the lower surface thereof, said slotted mating portion being formed to complement the cross-sectional configuration of the screen forming rods and having gripping surfaces proportioned to mate with, encompass, and frictionally grip only the upper portion of said screen forming rods.

2. A screen structure defined in claim 1 wherein each of said elongated readily removable resilient coverings is formed of a wear resistant extruded rubber composition.

References Cited in the file of this patent

UNITED STATES PATENTS

| 770,079 | Lamb | Sept. 13, 1904 |
| 1,491,802 | Irwin | Apr. 29, 1924 |
| 2,369,723 | Denlinger | Feb. 20, 1945 |
| 2,443,176 | Banning | June 15, 1948 |
| 2,804,208 | Van Hardefeld et al. | Aug. 27, 1957 |
| 2,837,210 | Ackert | June 3, 1958 |

FOREIGN PATENTS

| K 22,836 | Germany | Nov. 10, 1955 |